United States Patent Office 3,733,283
Patented May 15, 1973

3,733,283
FLAMEPROOF POLYLACTAM COMPOSITION AND PROCESS FOR ITS MANUFACTURE
Ray B. Duggins, Chadds Ford, Pa., assignor to E. I. du Pont de Nemours and Company, Wilmington, Del.
No Drawing. Filed May 10, 1971, Ser. No. 141,953
Int. Cl. C08j 1/24
U.S. Cl. 260—2.5 N
24 Claims

ABSTRACT OF THE DISCLOSURE

A flameproof polylactam composition containing 20 to 80% by weight of hydrated alumina or hydrated calcium sulfate is manufactured by first heating the filler to a temperature of 100–300° C., mixing the filler with lactam monomer, polymerization catalysts and initiators, and finally heating the mixture under anhydrous conditions to a temperature of 135 to 170° C. for a time sufficient to cause polymerization.

BACKGROUND OF THE INVENTION

This invention relates to filled polylactam compositions, or more specifically to polylactam compositions containing hydrated inorganic fillers such as hydrated alumina or hydrated calcium sulfate, and a process for their manufacture.

Filled polylactam compositions and the various methods for their manufacture constitutes a well-developed art. The state of this art is exemplified by U.S. Pat. No. 3,372,137, issued to P. A. Tierney on Mar. 5, 1968 which discloses a mineral reinforced polylactam composition and a method for its manufacture. Polylactam compositions such as this have received widespread acceptance in a number of industries, including the building industry, but it is generally conceded that further penetration into these markets, especially the high volume areas of the building industry, is in great part dependent upon the development of "fireproof" compositions. While no plastic composition can be completely "fireproof" in the sense that steel and brick are fireproof, some progress has been made in producing "flameproof" or "self-extinguishing" plastic compositions by incorporating "fire retardants" into the compositions. One way to produce "self-extinguishing" methacrylate polymer compositions is disclosed in copending U.S. application Ser. No. 3,524, filed on Jan. 16, 1970 by R. B. Duggins and assigned to the assignee of the present invention, where a hydrated alumina filler is incorporated into a methacrylate polymer composition. When the composition begins to burn, the water of hydration is released to extinguish the flame, hence the term "self-extinguishing."

Hydrated fillers normally contain both weakly bound surface water and tightly bound water of hydration. For the purpose of the present invention the term hydrated fillers shall mean a filler having at the very least a substantial amount of its water of hydration. Polyester polymerization does not appear to be affected by the presence of water so hydrated fillers can and have been used in making polyester compositions for many years. Before the work on rapid polymerization of methacrylate discussed in the Duggins application referred to above, however, it was generally believed that any water present during the polymerization of methacrylates would poison the reaction to the point where complete polymerization would not occur. For this reason, prior to that disclosure, hydrated fillers were not used in methacrylate polymer compositions. As disclosed in the Duggins application, however, it is now known that the presence of a small amount of water is beneficial to the polymerization of methacrylates, so that effective use of hydrated fillers to improve the flame retardancy and translucency of methacrylate polymer compositions is possible.

For polylactam compositions, however, the situation is quite different. Anionic polymerization of lactam monomer must be accomplished under anhydrous conditions. The presence of even a small amount of water in the polymerizable mixture will poison the reaction to the point where polymerization will not occur. Transamidation polymerization of lactam monomer, which requires small amounts of water for the reaction, takes place at temperatures and pressures which are high enough to drive off all of the water contained in the hydrated fillers within the time required to accomplish the polymerization. It is also difficult to achieve the high filler loading levels necessary to produce a "flameproof" structure with this type of polymerization process. For these reasons, no one has been able to incorporate hydrated fillers into a polylactam composition. Any lactam polymerization process involving such filler is an anionic polymerization process, and includes a step in which all the water, both surface and hydration, is first driven off the filler before the filler is incorporated into the polymerizable composition. An example of this is to be found in the Tierney patent, mentioned above, in which the filler is heated to above 375° C. before it is mixed with the lactam monomer. At this temperature all of the surface water and substantially all of the water of hydration are rapidly driven off the inorganic filler so that it is no longer a hydrated filler and it is completely inert before it is incorporated into the composition. In this inert form, the filler contributes little or nothing to the flame retardancy of the composition.

SUMMARY OF THE INVENTION

It has now been found that it is the surface water, not the water of hydration in hydrated fillers, that poisons the lactam polymerization reaction; that if the surface water can be removed without removing a substantial amount of the water of hydration, a polylactam composition containing as much as 80% by weight of a hydrated inorganic filler can be produced; and that this polylactam composition, containing the surface-dry hydrated filler, exhibits improved flame retardant properties.

Stated generally, the present invention involves a process in which a hydrated inorganic filler is first heated to an elevated temperature for a time sufficient to drive off substantially all of its surface water but not sufficient to drive off all of its water of hydration, thereby forming a surface-dry hydrated inorganic filler. Between 20–80% by weight of this surface-dry inorganic filler is then mixed with lactam monomer, a lactam polymerization catalyst and a lactam polymerization initiator to form a polymerizable mixture. Finally, the polymerizable mixture is maintained under anhydrous conditions at a temperature sufficient to polymerize the lactam monomer, i.e., above about 135° C., but below the temperature at which water of hydration is evolved from the inorganic filler, for a time sufficient to cause polymerization of the lactam monomer. The amount of filler used is not critical; but below about 20% by weight, the amount of water contained in the filler is insufficient to promote the self-extinguishing features of the composition, and above about 80% by weight, the amount of filler becomes too great to form a homogeneous structure.

Hydrated alumina (i.e., hydrated aluminum oxide), particularly aluminum trihydrate ($Al_2O_3 \cdot 3H_2O$), sometimes called alumina trihydrate, has been found to be particularly suitable for the practice of the present invention. When aluminum trihydrate is heated to a temperature of 135–175° C. the loosely bound surface water is rapidly evolved, but little or no water of hydration is evolved. At temperatures above 175° C. the more tightly bound water is driven off in incremental amounts until, at about 300° C., only about 25% of the initial water remains. The remaining water is evolved as the temperature is raised up to about 700° C. While it is preferable to heat the aluminum trihydrate up to a temperature of 135–175° C., because in this range only surface water will be evolved and the remaining water will be retained for use as the flame retardant component, the aluminum trihydrate can, in fact, be heated up to almost 700° C. without removing all of its water of hydration. The amount of water retained, then, depends on the temperature to which the aluminum trihydrate is raised. At 175° C. it is surface dry, but retains virtually all of its water of hydration. At 300° C. it is also surface dry, but it has lost 75% of its water of hydration. At this point, however, the 25% remaining water still provides some flame retardancy. At higher temperatures, as it loses more and more of its water of hydration, Its effectiveness as a flame retardant component in the polylactam composition decreases.

Between 20–80% by weight, preferably 40–60% by weight, of the surface-dry aluminum trihydrate is then added to the lactam monomer, polymerization catalyst and polymerization initiator, to form the polymerizable mixture. The temperature of this polymerizable mixture is maintained between about 135–170° C. for a time sufficient to cause polymerization. If the temperature exceeds about 170° C., a sufficient amount of the tightly bound water will be released to poison the reaction. This temperature appears to be the ragged edge of operability. For reasons probably related to localized temperature fluctuation, polymerization may be accomplished or may fail at temperatures slightly above or slightly below 170° C., the temperature at which the water of hydration begins to evolve. To be absolutely certain that polymerization will take place, the temperature should be maintained below 170° C., at 160° C. for example, and preferably in the range of 135 to 150° C.

While the above discussion has been limited to aluminum trihydrate, the same temperature limits will apply to any of the hydrated forms of aluminum oxide and calcium sulfate, particularly the hemihydrate of calcium sulfate ($CaSO_4 \cdot \frac{1}{2}H_2O$). Other hydrated inorganic fillers, the list of which is well known to those skilled in the art, can also be used as long as the general procedure set forth in the preceding paragraphs is followed.

Heat is evolved during the anionic polymerization of lactam monomer. Even though the heat supplied to the polymerizable composition does not raise the temperature above 170° C., unless some care is taken, the evolved heat may raise the overall temperature of the mix, or localized portions of it, above this temperature so that water will evolve to poison the reaction. One way to prevent this from happening is to cast the polymerizable mixture into massive molds or steam heated molds which act as heat sinks to dissipate the heat evolved in the process. Another way to accomplish the same result is to initially supply a lower temperature to the polymerizable mixture, so that even with the heat evolved, the overall temperature will be maintained below the critical level.

Any anionic lactam polymerization process can be used in the practice of the present invention. Of particular interest are processes leading to foamed polylactam compositions. One such process is disclosed in U.S. Pat. No. 3,232,892, issued to C. F. Fisher on Feb. 1, 1966 and assigned to the assignee of the present invention. This process comprises mixing anhydrous ε-caprolactam, an anionic catalyst, an iminium anion, a foaming agent and a cocatalyst capable of promoting polymerization of ε-caprolactam at a temperature below the fusion point of polycaprolactam, all in the presence of a surface active agent selected from the group consisting of alkali metal salts of long-chain saturated and unsaturated fatty acids containing 8–25 carbon atoms, alkali metal sarcosinates and alkali metal oleylmethyltaurates; the preferred alkali metal salt being an alkali metal stearate. A second useful polymerization process is described in U.S. Pat. No. 3,214,415 issued on Oct. 26, 1965 to J. W. Giberson, and assigned to the assignee of the present invention, in which an anhydrous lactam having from 3 to 12 carbon atoms in the ring, preferably ε-caprolactam, is polymerized in the presence of a lactam base salt, and a cocatalyst of from about 0.05 to 5 mole percent, based on lactam, of the β-lactone of 2,2,4-trimethyl-3-hydroxy-3-pentenoic acid.

The invention can be more clearly understood from the following examples:

EXAMPLE 1

An unfoamed polylactam composition containing 60% by weight of aluminum trihydrate was prepared by the following process. Two tubes were preheated by immersion in an oil bath maintained at a temperature of 155° C. In the first of these tubes 25 g. of ε-caprolactam was melted in the presence of a rapid nitrogen sparge. In the second tube, 175 g. ε-caprolactam was melted under the same conditions.

The following substances were added to the first tube

|  | G. |
|---|---|
| Potassium stearate (dried overnight at 25–35° C. under vacuum) | 1.0 |
| Sodium hydride | 1.26 |

The following substances were added to the second tube

|  | G. |
|---|---|
| A polyamide terpolymer (composed of 33.6 weight percent hexamethylene adipamide units, 23.4 weight percent hexamethylene sebacamide units and 43 weight percent alpha, omega-caproamide units) (dried overnight at 80° C. under vacuum) | 2.0 |
| Poly[2,2-propane bis(4-phenyl carbonate)] (dried overnight at 110–120° C.) | 1.8 |
| Aluminum trihydrate (dried overnight at 150° C.) | 308.5 |

The contents of the first tube were then added to the second tube, and after mixing, the resultant composition was cast into a steam heated mold maintained at 150° C. until polymerization was complete. The resulting polylactam article was useful as a flame-retardant roofing material.

EXAMPLES 2–3

Polylactam structures were prepared according to the process set forth in Example 1, the difference being in the amount of aluminum trihydrate filler used. In Example 2, 40% by weight of aluminum trihydrate was used; in Example 3, 20% was used. In the following table, the Flame Spread Factor ($F_s$), the Heat Evolution Factor (Q), and the Flame Spread Index ($I_s = F_s \times Q$) as measured by the Radiant Panel Test (ASTM. E 162–60), for these three examples are compared with the results obtained for similar structures containing calcium carbonate rather than aluminum trihydrate.

TABLE

| Example | Percent and type of filler | $F_s$ | Q | $I_s$ |
|---|---|---|---|---|
| 1 | 60% $Al_2O_3 \cdot 3H_2O$ | 2.1 | 12.8 | 27 |
| 2 | 40% $Al_2O_3 \cdot 3H_2O$ | 2.8 | 26.2 | 74 |
| 3 | 20% $Al_2O_3 \cdot 3H_2O$ | 4.8 | 41.6 | 198 |
|  | 60% $CaCO_3$ | 2.3 | 17.3 | 40 |
|  | 40% $CaCO_3$ | 2.3 | 26.9 | 92 |
|  | 20% $CaCO_3$ | 7.9 | 28.8 | 228 |

The lower the Flame Spread Index the more acceptable the product. It should be noted that in each case, the Flame Spread Index for the sample containing aluminum trihydrate was lower than that for the sample containing a comparable amount of calcium carbonate. The dripping of hot material also contributes to the spread of a fire and is to be avoided. Dripping was noted with all samples, except that of Example 1, but the compositions containing calcium carbonate all showed more dripping than the corresponding samples containing aluminum trihydrate.

EXAMPLE 4

A foamed polylactam composition containing 60% by weight of aluminum trihydrate was prepared using a process similar to that set forth in Example 1 except that the first tube contained:

| | G. |
|---|---|
| ε-Caprolactam | 20.0 |
| Potassium stearate (dried overnight at 25–35° C. under vacuum) | 0.5 |
| Disodium-N-tallow-beta-imino dipropionate | 0.25 |
| Sodium hydride | 0.72 | and the second tube contained:

| | G. |
|---|---|
| ε-Caprolactam | 80.0 |
| Poly[2,2-propane bis(4-phenylcarbonate)] (dried overnight at 110–120° C.) | 0.9 |
| Aluminum trihydrate (dried overnight at 150° C.) | 154.0 |
| Benzyl formate | 0.5 |

EXAMPLE 5

A foamed polylactam composition containing 20% by weight of the hemihydrate of calcium sulfate can be prepared using the following process. In a first tube, maintained at 135° C., combine:

| | |
|---|---|
| ε-Caprolactam g | 150.0 |
| Potassium stearate (dried overnight at 25–35° C. under vacuum) g | 1.25 |
| Disodium-N-tallow-beta-imino dipropionate g | 0.75 |
| Sodium hydride ml | 3.5 |

In a second tube, also maintained at 135° C., combine:

| | |
|---|---|
| ε-Caprolactam g | 150.0 |
| Poly[2,2-propane bis(4-phenyl carbonate)] (dried overnight at 110–120° C.) g | 2.7 |
| Aluminum trihydrate (dried overnight at 150° C.) g | 75.0 |
| Benzyl formate ml | 3.2 |

Mix the contents of the two tubes and maintain at 135° C. until polymerized.

What is claimed is:

1. An anionic process for preparing filled polylactam compositions comprising:
   (a) heating a hydrated inorganic filler to a temperature sufficient to remove its surface water but not its water of hydration, thereby forming a surface-dry hydrated inorganic filler;
   (b) forming a polymerizable mixture by combining lactam monomer, a lactam polymerization catalyst and a lactam polymerization initiator with 20 to 80% by weight of the polymerizable mixture of said surface-dry hydrated inorganic filler; and
   (c) polymerizing said polymerizable mixture by maintaining it under anhydrous conditions at a temperature sufficient to polymerize the lactam, but below the temperature at which water of hydration is evolved from said surface-dry hydrated inorganic filler, for a time sufficient to cause polymerization of said lactam monomer.

2. The process of claim 1 wherein said lactam monomer is ε-caprolactam, said catalyst is an alkali metal hydride and the temperature at which said polymerizable mixture is maintained is 150 to 160° C.

3. The process of claim 1 wherein said filled polylactam composition is a foamed polycaprolactam composition and wherein the step of forming a polymerizable mixture comprises mixing anhydrous ε-caprolactam, an anionic catalyst, an iminium anion, a foaming agent and a cocatalyst capable of promoting polymerization of ε-caprolactam at a temperature below the fusion point of polycaprolactam, all in the presence of a surface active agent selected from the group consisting of alkali metal salts of long-chain saturated and unsaturated fatty acids containing 8 to 25 carbon atoms, alkali metal sarcosinates, and alkali metal oleylmethyltaurates.

4. The process of claim 3 wherein the alkali metal salt is an alkali metal stearate.

5. The process of claim 1 wherein said lactam is an anhydrous lactam having from 3 to 12 carbon atoms in the ring, and said polymerizable mixture also contains a lactam base salt and a cocatalyst of from about 0.05 to 5 mole percent, based on lactam, of the β-lactone of 2,2,4-trimethyl-3-hydroxy-3-pentenoic acid.

6. An anionic process for preparing filled polylactam compositions comprising:
   (a) heating a hydrated inorganic filler to a temperature of 100 to 300° C., thereby forming a surface-dry hydrated inorganic filler;
   (b) forming a polymerizable mixture by combining lactam monomer, a lactam polymerization catalyst and a lactam polymerization initiator with 20 to 80% by weight of the polymerizable mixture of said surface-dry hydrated inorganic filler; and
   (c) polymerizing said polymerizable mixture by maintaining it under anhydrous conditions at a temperature of 135 to 170° C. for a time sufficient to cause polymerization of said lactam monomer.

7. The process of claim 6 wherein said hydrated inorganic filler is selected from the group consisting of hydrated alumina and hydrated calcium sulfate.

8. The process of claim 6 wherein said hydrated inorganic filler is aluminum trihydrate.

9. The process of claim 6 wherein said hydrated inorganic filler is heated to a temperature of 100 to 175° C. to form said surface-dry hydrated inorganic filler.

10. The process of claim 9 wherein said hydrated inorganic filler is aluminum trihydrate.

11. The process of claim 6 wherein said polymerizable mixture is maintained at a temperature of between 135 to 150° C.

12. The process of claim 11 wherein said hydrated inorganic filler is aluminum trihydrate.

13. An anionic process for preparing a filled polylactam composition comprising:
   (a) heating aluminum trihydrate to a temperature between 100 to 175° C., thereby forming surface-dry aluminum trihydrate;
   (b) forming a polymerizable mixture by combining lactam monomer, a lactam polymerization catalyst and a lactam polymerization initiator with 20 to 80% by weight, based on the total weight of the mixture, of said surface-dry aluminum trihydrate, to form a polymerizable mixture; and
   (c) polymerizing said polymerizable mixture by maintaining it under anhydrous conditions at a temperature of 135 to 170° C. for a time sufficient to cause polymerization of said lactam monomer.

14. The process of claim 13 wherein said lactam monomer, lactam polymerization catalyst and lactam polymerization initiator are combined with 40 to 60% by weight, based on the total weight of the mixture, of said surface-dry aluminum trihydrate.

15. The process of claim 14 wherein said polymerizable mixture is maintained at a temperature between 135 to 150° C.

16. The process of claim 13 wherein said lactam monomer is ε-caprolactam monomer, said catalyst is an alkali metal hydride and the temperature at which said mixture is polymerized is 150 to 160° C.

17. The process of claim 13 wherein said filled polylactam composition is a foamed polycaprolactam composition and wherein the step of forming a polymerizable mixture comprises mixing anhydrous ε-caprolactam, an anionic catalyst, an iminium anion, a foaming agent and a cocatalyst capable of promoting polymerization of ε-caprolactam at a temperature below the fusion point of polycaprolactam, all in the presence of a surface active agent selected from the group consisting of alkali metal salts of long-chain saturated and unsaturated fatty acids containing 8 to 25 carbon atoms, alkali metal sarcosinates and alkali metal oleylmethyltaurates.

18. The process of claim 17 wherein the alkali metal salt is an alkali metal stearate.

19. The process of claim 13 wherein said lactam is an anhydrous lactam having from 3 to 12 carbon atoms in the ring, and said polymerizable mixture also contains a lactam base salt and a cocatalyst of from about 0.05 to 5 mole percent based on lactam of the β-lactone of 2,2,4-trimethyl-3-hydroxy-3-pentenoic acid.

20. An article of manufacture containing polylactam and from about 20 to 80% by weight of a surface-dry inorganic hydrated filler.

21. The article of claim 20 wherein said surface-dry inorganic hydrated filler is selected from the group consisting of hydrated alumina and hydrated calcium sulfate.

22. The article of claim 21 wherein said inorganic hydrated filler is aluminum trihydrate.

23. The article of claim 22 wherein said polylactam is polycaprolactam.

24. The article of claim 22 containing about 40 to 60% by weight of said surface-dry inorganic hydrated filler.

References Cited
UNITED STATES PATENTS

| | | | |
|---|---|---|---|
| 3,300,422 | 1/1967 | Bayerlein et al. | 260—2.5 N |
| 3,166,533 | 1/1965 | Wichterle | 260—78 R |
| 2,205,722 | 6/1940 | Graves | 260—37 N |
| 2,846,332 | 8/1958 | Nesty | 260—37 N |

SAMUEL H. BLECH, Primary Examiner

M. FOELAK, Assistant Examiner

U.S. Cl. X.R.

260—18 N, 37 N, 45.7 R, 857 PE, DIG. 24

(5/69)

CERTIFICATE OF CORRECTION

Patent No. 3,733,282   Dated May 15, 1973

Inventor(s) Ray B. Duggins

It is certified that error appears in the above-identified patent and that said Letters Patent are hereby corrected as shown below:

Column 5, line 41, delete the words "aluminum trihydrate" and insert in their place the words --calcium sulfate hemihydrate--.

Signed and sealed this 20th day of November 1973.

(SEAL)
Attest:

EDWARD M. FLETCHER, JR.
Attesting Officer

RENE D. TEGTMEYER
Acting Commissioner of Patents